Patented July 26, 1949

2,477,443

UNITED STATES PATENT OFFICE 2,477,443

ACTIVATED ZINC DUST FOR GOLD AND SILVER PRECIPITATION

Dwight J. A. Dahlgren, Luther G. Hendrickson, and Dinsmore Laurence Griffith, Flin Flon, Manitoba, Canada, assignors to Hudson Bay Mining and Smelting Co. Limited, Winnipeg, Manitoba, Canada, a corporation of Canada No Drawing. Application June 20, 1947, Serial No. 756,100. In Canada July 9, 1946

4 Claims. (Cl. 75—107)

This invention relates to the precipitation of a precious metal, which term in this specification means gold or silver, in the cyanide process of recovering these metals.

In that process the cyanide solution in which the ore has been leached in the presence of oxygen and which is called the "pregnant solution," is commonly treated with finely divided zinc in order to precipitate the gold and silver. It is then filtered, and the precipitate treated by well known methods in order to recover gold and silver bullion.

For this purpose finely divided zinc has been used in the form of shavings, but these are too coarse to act as an efficient precipitant, and resort has been made to zinc dust produced either by distilling zinc and rapidly condensing the distillate or by directing a blast of air at a small stream of molten zinc and thus atomizing it. The use of zinc dust of either kind is, however, open to objection. The cost of zinc dust produced by distillation is high and the less expensive dust produced by atomisation is too coarse to give as effective results as does the distilled zinc dust, although metallic zinc, which is the active reagent in precipitating the gold and silver, is present normally to the extent of only about 80% of the distilled zinc dust, the remaining zinc being present as zinc oxide, whereas atomised zinc dust is almost wholly metallic zinc.

We have discovered that if atomised zinc dust is treated with a solution of a salt of copper and a salt of antimony its precipitating power is so much improved that weight for weight it is both less expensive and more efficient than even distilled zinc dust. The effect of the treatment is to coat the zinc dust with copper and antimony.

The preferred treatment of the atomised zinc dust consists in agitating it for a period of the order of an hour in a solution of copper sulphate and tartar emetic, the ratio of zinc, copper and antimony in the agitated mixture being about 300:150:7. After treatment the dust can be transferred to the zinc dust feeder apparatus and is introduced into the pregnant solution in the usual way.

Zinc dust produced by distillation may also be treated with advantageous results in the same way as atomised zinc dust, but the advantage thereby secured is normally insufficient to overbalance the excess cost of distilled over atomised zinc dust.

We have found that the relative yields under similar conditions resulting from the use of three alternative forms of zinc dust under similar conditions are as follows:

| | Ounces of gold and silver precipitated per lb. of zinc dust | |
|---|---|---|
| | Gold | Silver |
| Untreated atomized zinc dust | 0.0016 | 0.081 |
| Distillation zinc dust | 0.0137 | 0.139 |
| Treated atomized zinc dust | 0.0160 | 0.165 |

We claim:

1. The process of precipitating a precious metal from a pregnant cyanide solution, which comprises subjecting zinc dust to treatment in a solution of a water soluble salt of copper and a water soluble salt of antimony in proportions of about 300 parts of zinc dust to every 150 parts of copper and 7 parts of antimony contained in the solution, and introducing the zinc dust so treated into the pregnant cyanide solution.

2. The process according to claim 1, in which the copper salt is copper sulphate and the antimony salt is tartar emetic.

3. The process of precipitating a precious metal from a pregnant cyanide solution which comprises treating zinc dust in a solution containing a water soluble salt of copper and a water soluble salt of antimony and subsequently introducing the treated zinc dust into the pregnant cyanide solution.

4. The process of precipitating a precious metal from a pregnant cyanide solution which comprises coating zinc dust with copper and antimony and introducing the coated zinc dust into the pregnant cyanide solution.

DWIGHT J. A. DAHLGREN.
LUTHER G. HENDRICKSON.
D. LAURENCE GRIFFITH.

REFERENCES CITED

The following references are of record in the file of this patent:

FOREIGN PATENTS

| Number | Country | Date |
|---|---|---|
| 322,278 | Canada | May 10, 1930 |